(12) United States Patent
Rottinghaus

(10) Patent No.: US 8,356,964 B2
(45) Date of Patent: Jan. 22, 2013

(54) RETAINING PIN WITH SELF BIASING KEEPING MEANS

(76) Inventor: Robert Rottinghaus, Jesup, IA (US)

( * ) Notice: Subject to any disclaimer, the term of this patent is extended or adjusted under 35 U.S.C. 154(b) by 0 days.

(21) Appl. No.: 13/464,518

(22) Filed: May 4, 2012

(65) Prior Publication Data
US 2012/0219384 A1 Aug. 30, 2012

Related U.S. Application Data

(63) Continuation of application No. 12/731,250, filed on Mar. 25, 2010, now abandoned.

(51) Int. Cl.
*F16B 19/08* (2006.01)
(52) U.S. Cl. .......................... 411/502; 411/508
(58) Field of Classification Search ............. 411/508, 411/509, 510, 513, 514, 502, 516
See application file for complete search history.

(56) References Cited

U.S. PATENT DOCUMENTS

| | | | |
|---|---|---|---|
| 2,471,175 A | 5/1949 | Tubbs | |
| 2,529,420 A | 11/1950 | Ramquist | |
| 2,702,923 A | 3/1955 | Rahaim | |
| 3,217,584 A | 11/1965 | Amesbury | |
| 3,289,525 A | 12/1966 | Lee | |
| 3,474,506 A | 10/1969 | Metz | |
| 3,596,554 A | 8/1971 | Low et al. | |
| 4,076,430 A | 2/1978 | Crook | |
| 4,113,397 A | 9/1978 | Snyder | |
| 4,130,369 A | 12/1978 | Wojcik | |
| 4,133,245 A | 1/1979 | Ruihley et al. | |
| 4,630,983 A * | 12/1986 | Fischer | 411/15 |
| 4,658,481 A | 4/1987 | Seyler et al. | |
| 4,781,504 A | 11/1988 | Yuta | |
| 5,143,500 A | 9/1992 | Schuring et al. | |
| 5,271,588 A | 12/1993 | Doyle | |
| 5,599,512 A | 2/1997 | Latulippe et al. | |
| 5,619,810 A | 4/1997 | Kasim | |
| 5,722,124 A | 3/1998 | Wisniewski | |
| 6,042,317 A * | 3/2000 | Fischer | 411/508 |
| 6,045,291 A * | 4/2000 | Ruehle et al. | 403/297 |
| 6,357,955 B1 | 3/2002 | Hoffmann et al. | |
| 6,634,843 B1 | 10/2003 | Tarnow et al. | |
| 6,786,669 B2 | 9/2004 | Tsui et al. | |
| 2003/0170070 A1 | 9/2003 | Mills et al. | |
| 2003/0170071 A1 | 9/2003 | Tsui et al. | |
| 2005/0276658 A1 | 12/2005 | Silva | |
| 2009/0196683 A1 | 8/2009 | Lunn et al. | |

\* cited by examiner

*Primary Examiner* — Gary Estremsky
(74) *Attorney, Agent, or Firm* — Greer, Burns & Crain, Ltd.

(57) ABSTRACT

A retaining pin with self biasing keeping means has a head and a tubular pin that has a plurality of detent fingers on its end. The detent fingers are formed by slitting and deforming the ends of the pin. The detent fingers are bent to extend beyond the outside diameter of the pin with the forward ends terminating in a diameter smaller than that diameter. As the pin is inserted in a matched opening, the detent fingers compress to allow the pin to penetrate the opening and then return to their original position to retain them therein. To remove the pin, the process is reversed. The instant retaining pin with self biasing keeping means is conducive to modern mass production methods of production such as cold heading.

10 Claims, 5 Drawing Sheets

RETAINING PIN WITH SELF BIASING KEEPING MEANS

CROSS-REFERENCE

This application is a continuation of U.S. Utility patent application Ser. No. 12/731,250, filed Mar. 25, 2010.

BACKGROUND OF THE INVENTION

Almost as soon as tools were invented, it became apparent that having a means to keep one part connected to another was very important. Throughout history many solutions to this problem have been found such as pins with cotter pins, retaining rings, clevis pins with cotter pins or detent balls. One of the problems with both cotter pins and retaining rings is that they require an additional part. Additionally, because of this, it is easy to lose the pin or ring requiring obtaining a new one. The clevis pin with detent balls overcomes this limitation since the detent balls are self contained, they are more complex and require a spring and retaining means to keep the detent balls contained.

There is a need for a simple, easily manufactured retaining pin that solves the problem of securing a connecting pin without the limitation of the prior art.

SUMMARY OF THE INVENTION

A retaining pin with self biasing keeping means has a head and a tubular pin that has a plurality of detent fingers on its end. The detent fingers are formed by slitting and deforming the ends of the pin. The detent fingers are bent to extend beyond the outside diameter of the pin with the forward ends terminating in a diameter smaller than that diameter. As the pin is inserted in a matched opening, the detent fingers compress to allow the pin to penetrate the opening and then return to their original position to retain them therein. To remove the pin, the process is reversed. The instant retaining pin with self biasing keeping means is conducive to modern mass production methods of production such as cold heading.

Other features and advantages of the instant invention will become apparent from the following description of the invention which refers to the accompanying drawings.

DETAILED DESCRIPTION OF THE INVENTION

Figure 1:
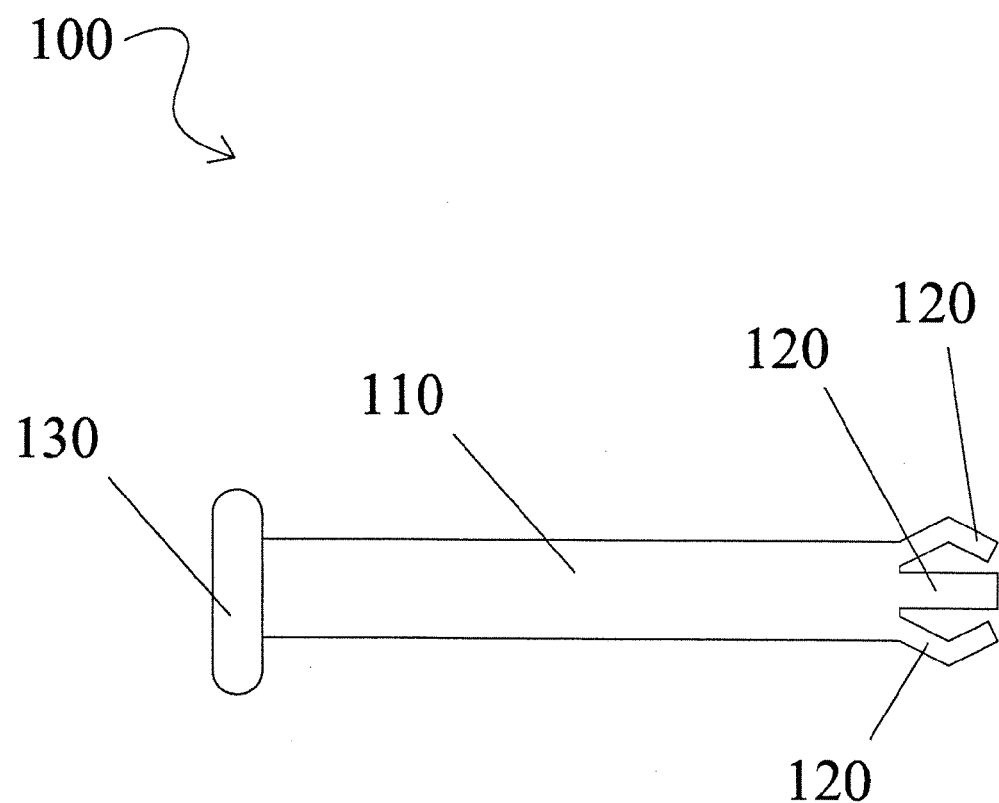
FIG. 1 is a side view of a retaining pin with self biasing keeping means according to an embodiment of the invention.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to FIG. 1, a retaining pin with self biasing keeping means 100 is shown having a pin portion 110 that is a hollow cylinder having an outside diameter and an inside diameter. A head 130 is formed at one end to keep pin 110 from moving past a desired position. A plurality of detent fingers 120 are provided to provide the biasing means to retaining pin 110 without the need for cotter pins, retaining rings or other detents.

Figure 2:
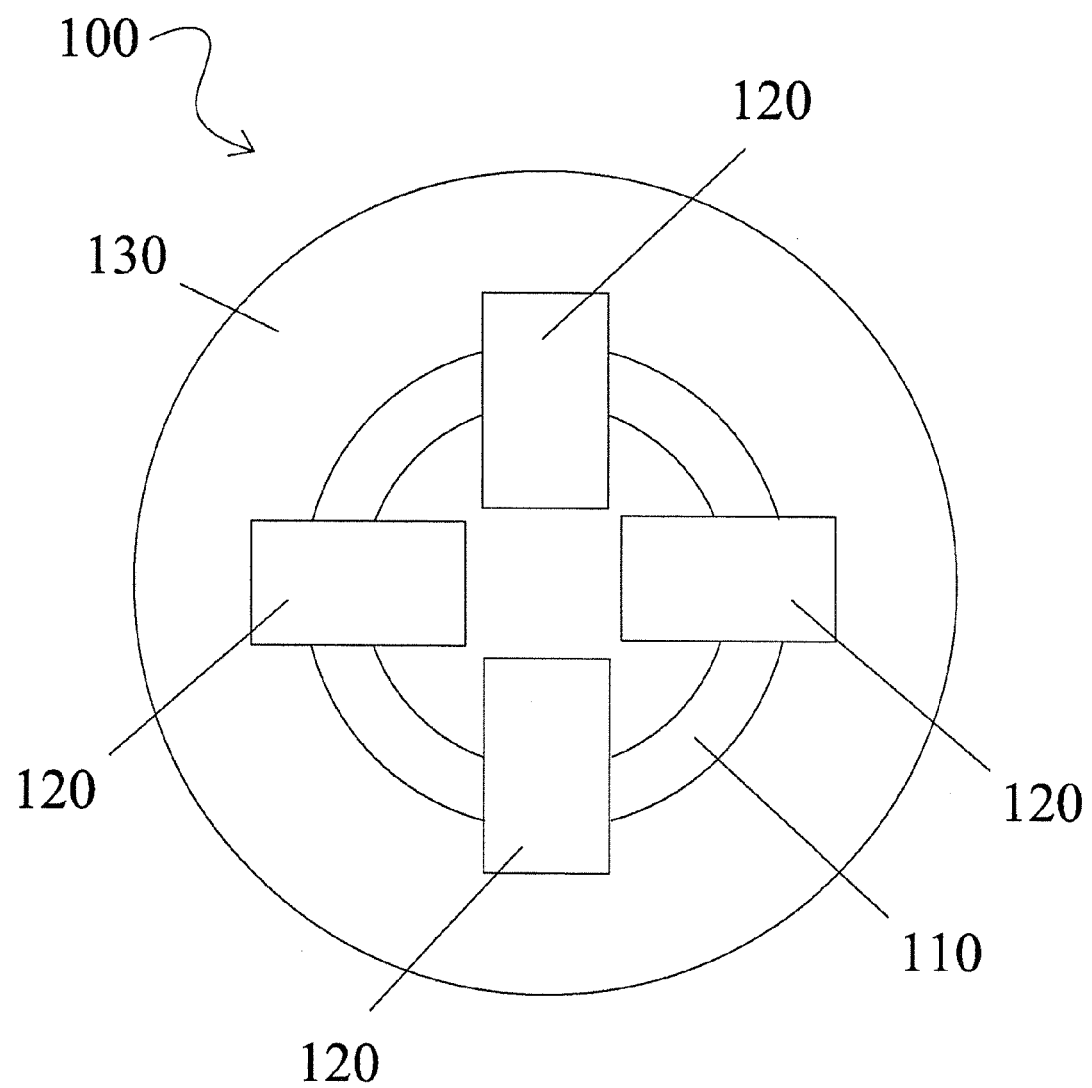
FIG. 2 is an end view of the retaining pin shown in FIG. 1 according to an embodiment of the invention.
Figure 3:
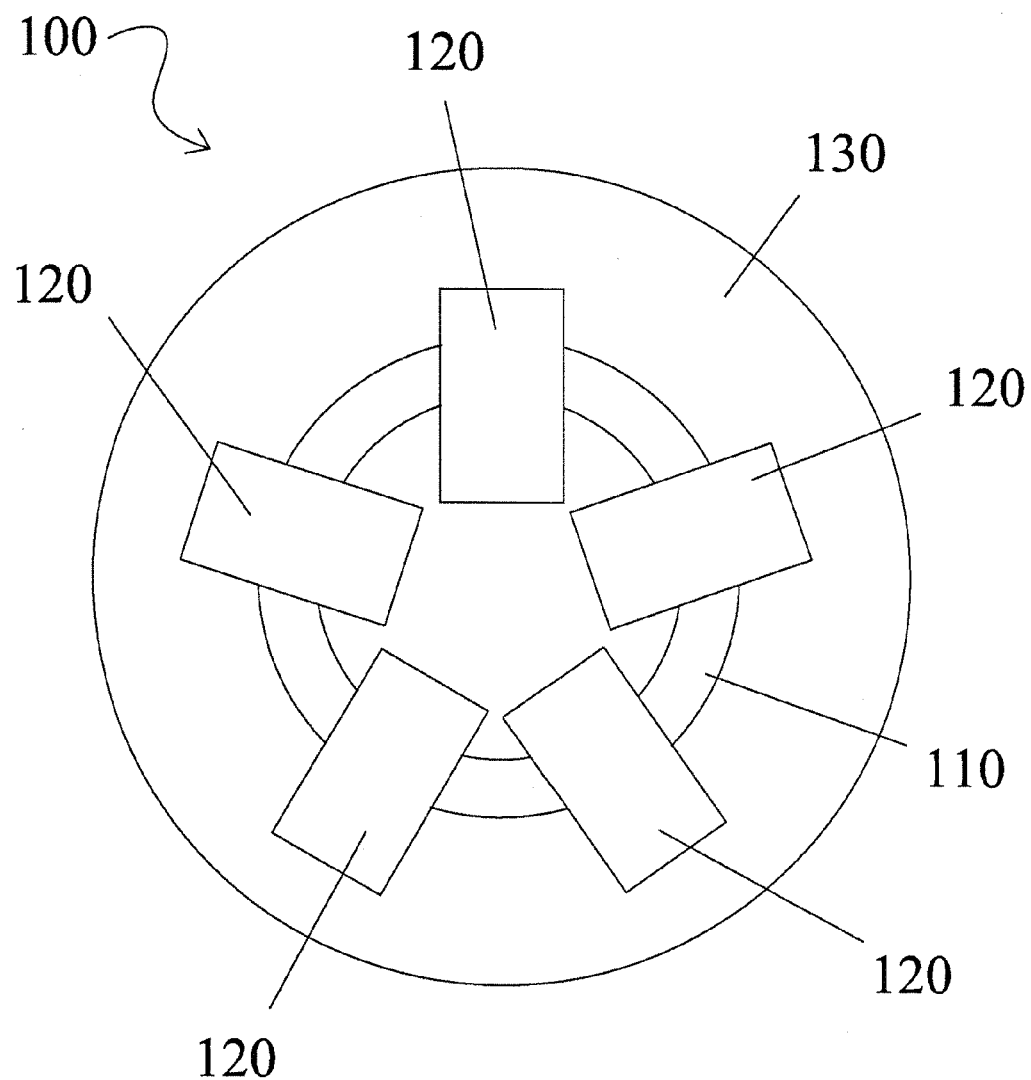
FIG. 3 is an end view of an alternative embodiment of the pin shown in FIG. 1.

As shown in FIG. 2, four detent fingers 120 are formed in the end of pin 110 by slitting and then deforming the ends so that a portion of detent fingers 125 extend past the outside diameter of pin 110. Similarly, five detent fingers 120 are shown in FIG. 3. Of course other numbers of detent fingers can be used depending on the particular application. In general, the smaller the fingers, the less force required to deform them to fit within the selected opening.

Figure 4:
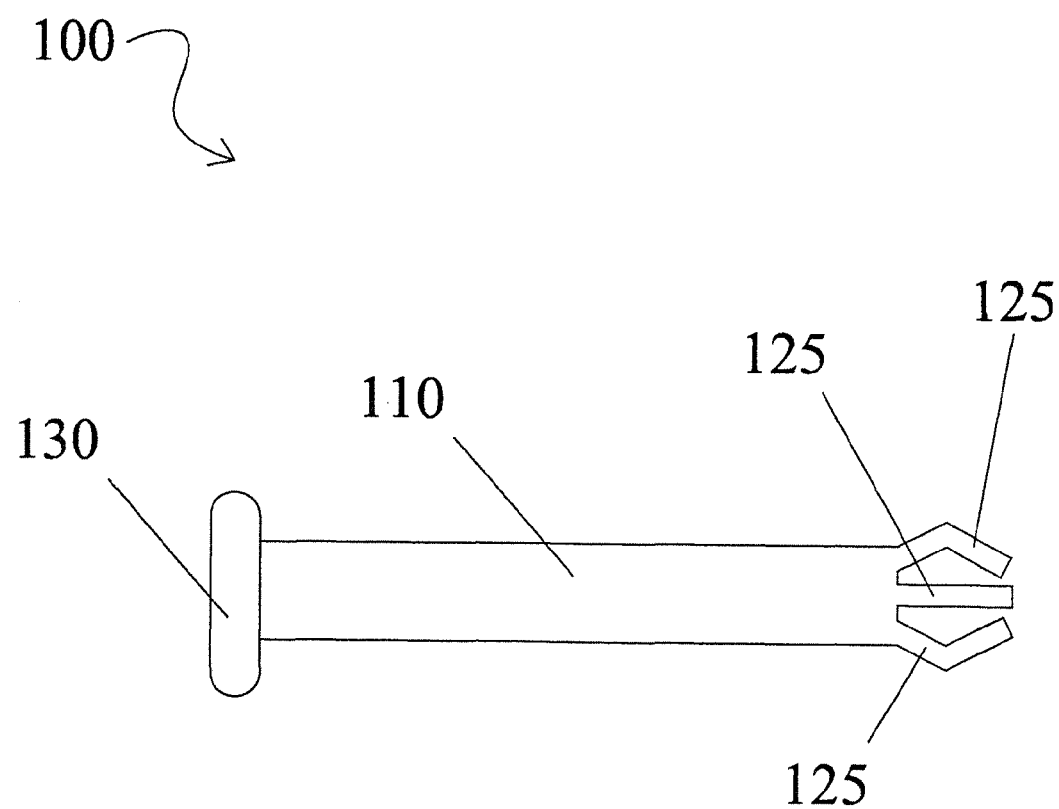
FIG. 4 is a side view of a retaining pin with self biasing keeping means according to another embodiment of the invention.

Referring now to FIG. 4, a retaining pin with self biasing retainer means is shown having a head 130 and tubular pin 110. In this embodiment, a plurality of detent fingers 125 is shown having a profile terminating in a smaller diameter to aid insertion into a part. Again, different profiles may be used without departing from the spirit of the invention and should be realized to be within the scope of this disclosure.

Figure 5A:
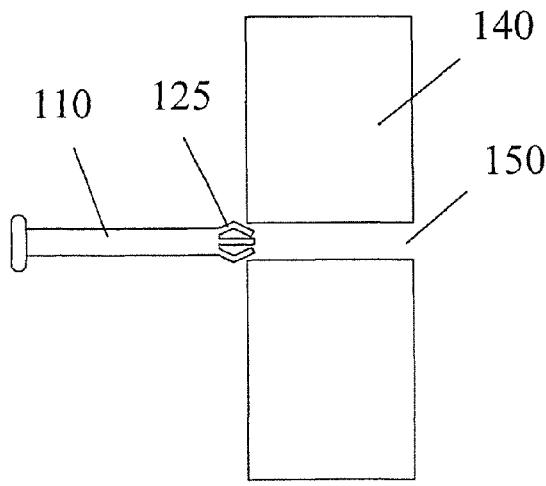
FIG. 5A is a side view of a retaining pin with self biasing keeping means as it is inserted in a typical part.
Figure 5B:
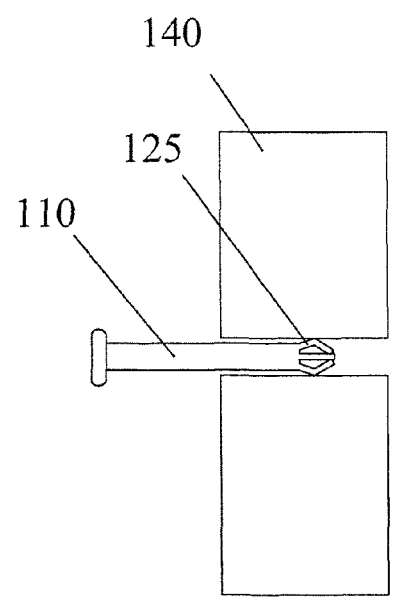
FIG. 5B is a side view of a retaining pin with self biasing keeping means as it is inserted in a typical part showing compression of the detent fingers.
Figure 5C:
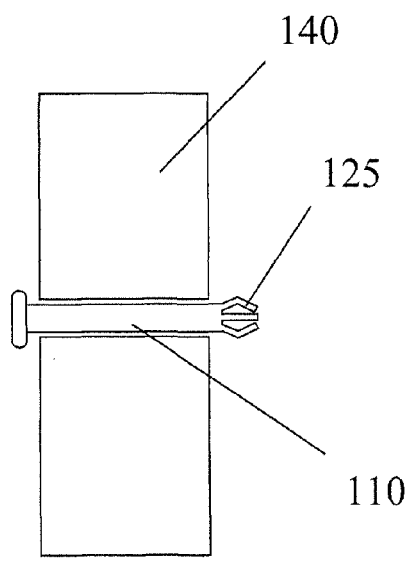
FIG. 5C is a side view of a retaining pin with self biasing keeping means as it is inserted in a typical part showing the detent fingers returning to a normal position.

Now referring to FIGS. 5A through 5C, retaining pin 110 is pressed against an opening 150 in a part 140. As force is applied, detent fingers 125 compress thus reducing the effective diameter allowing pin 110 to fit within opening 150. As pin 110 passes through opening 150, detent fingers 125 return to their original non-compressed state and provide biasing to retain pin 110 without further means. To remove pin 110, the process is reversed.

Retaining pin 110 is made of a resilient metal that allows forming such as aluminum or steel. The entire pin may be heat treated to provide the needed flexibility as is known in the art. Additionally, the pin may be heat treated after forming to allow easier manufacturing. Of course other materials may be used such as nylon, etc. as is known in the art as long as the detent fingers are compressible and then return to their original position. Additionally, the detent fingers could be a separate piece or pieces that are attached using a suitable method such as welding. One of the advantages of the present invention is that is can be inexpensively produced in mass production using a process such as cold forging (also known as cold heading). This greatly reduces the cost over many of the prior art retaining pins.

Although the instant invention has been described in relation to particular embodiments thereof, many other variations and modifications and other uses will become apparent to those skilled in the art.

What is claimed is:

1. A retaining pin with self biasing keeping means comprising:
    a pin having a first fixed outside diameter and a second fixed inside diameter and first and second opposed ends;
    a solid, continuous head portion disposed on the first end of said pin for restraining movement of said pin past said head portion;
    means for retaining said pin in a matched opening having first and second opposed ends and an inner diameter larger than the first fixed outside diameter of said pin, said means for retaining said pin including a plurality of resilient detent fingers radially disposed along the second opposed end of said pin; and said plurality of resilient detent fingers extending less than half of a length of said pin;

wherein each of said detent fingers includes a respective generally planar, linear first proximal portion extending from said pin radially outwardly beyond said first outside diameter and a respective generally planar, linear second distal portion extending radially inwardly from said first proximal portion, and wherein when said pin is inserted entirely through the matched opening, said detent fingers being adapted to compress radially inwardly and then to expand radially outwardly and return to an original position for preventing movement of said pin past said resilient detent fingers and retaining said pin in said matched opening; and wherein each one of said plurality of detent fingers having a narrow slit on each side thereof and a deformed portion disposed intermediate said first proximal and second distal portions and having a second outside diameter, and wherein said second outside diameter is larger than said first outside diameter.

2. The retaining pin with self biasing keeping means according to claim 1 wherein each of said plurality of detent fingers terminates in a diameter smaller than said first outside diameter.

3. The retaining pin with self biasing keeping means according to claim 1 wherein each of said plurality of detent fingers terminates in a diameter on the order of said first outside diameter.

4. The retaining pin with self biasing keeping means according to claim 1 having four detent fingers radially disposed along the second opposed end of said pin in a symmetrical manner.

5. The retaining pin with self biasing keeping means according to claim 1 having five detent fingers radially disposed along the second opposed end of said pin in a symmetrical manner.

6. The retaining pin with self biasing keeping means according to claim 1 wherein said retaining pin is comprised of a resilient metal.

7. The retaining pin with self biasing keeping means according to claim 6 further comprising plural weldments each attaching a respective detent finger to the opposite end of said pin.

8. The retaining pin with self biasing keeping means according to claim 6 wherein said resilient metal is steel or aluminum.

9. The retaining pin with self biasing keeping means according to claim 1 wherein said retaining pin is comprised of a heat treated metal.

10. The retaining pin with self biasing keeping means according to claim 1 wherein said retaining pin is comprised of nylon.

* * * * *